United States Patent [19]

Liu et al.

[11] Patent Number: 5,503,153

[45] Date of Patent: Apr. 2, 1996

[54] NOISE SUPPRESSION METHOD UTILIZING MOTION COMPENSATION FOR ULTRASOUND IMAGES

[75] Inventors: Dong-Chyuan Liu, Mercer Island; Ming Li, Seattle, both of Wash.

[73] Assignee: Siemens Medical Systems, Inc., Iselin, N.J.

[21] Appl. No.: 491,332

[22] Filed: Jun. 30, 1995

[51] Int. Cl.$^6$ .................................................... A61B 8/00
[52] U.S. Cl. .................................... 128/661.08; 73/861.25
[58] Field of Search ................ 128/660.07, 661.01, 128/660.02, 661.08, 661.09, 661.10, 662.02, 660.05; 73/625, 626, 861.25; 364/413.25

[56] References Cited

U.S. PATENT DOCUMENTS

| | | | |
|---|---|---|---|
| 5,188,113 | 2/1993 | Sato et al. | 128/661.09 |
| 5,315,512 | 5/1994 | Roth | 364/413.25 |
| 5,379,642 | 1/1995 | Reckwerdt et al. | 73/625 |

Primary Examiner—George Manuel

[57] ABSTRACT

A method for measuring the interframe movement of pixels in a second ultrasoud image frame with respect to the pixels in a first ultrasoud image frame. The movement information may be displayed to provide enhanced information about the underlying physiology or to provide a temporally compounded image having reduced noise. In the preferred embodiment of the present invention, the pixels in that actually change between frames are identified. The first frame is divided into blocks and an estimated velocity computed for each block having a sufficient number of pixels that actually moved between the first and second frames. After all of the velocity estimates have been computed, blocks having questionable velocity estimates are identified. Blocks for which the velocity estimate was questionable are then provided with a velocity estimate by interpolating the velocity vectors of the nearby blocks having valid velocity estimates. The preferred method for estimating the velocity utilizes a modified optical flow computation that is more stable than prior art optical flow models.

9 Claims, 3 Drawing Sheets

NOISE SUPPRESSION METHOD UTILIZING MOTION COMPENSATION FOR ULTRASOUND IMAGES

FIELD OF THE INVENTION

The present invention relates to ultrasound imaging, and more particularly, to a method for operating a computer to reduce artifacts in ultrasonic images and provide improved data displays.

BACKGROUND OF THE INVENTION

Medical ultrasound images are typically produced by generating an ultrasonic sound wave traveling in a known direction and observing the echoes created when the sound wave bounces off of boundaries between regions of differing density in the body. For any given direction, the image pixels are generated by plotting a dot whose brightness is proportional to the echo's amplitude at a coordinate whose location is a function of the time after a short pulse is send in the direction in question.

Medical ultrasound images are often very "noisy". In addition to the boundaries between vessels and organs, the images include a significant amount of speckling that make the detection of the boundaries of interest difficult. One method for reducing the speckling involves combining two or more frames in a time sequence. Unfortunately, respiration and involuntary movements such as heart beating cause the various organs to move relative to the ultrasound probe. This motion causes the boundaries of the organs to appear blurred when two or more frames are averaged.

Sequences of ultrasound images may also be used, in principle, to provide an analysis of the motion of the various tissue structures .i In those cases in which the analysis indicates that the boundaries have not moved significantly, frame averaging may be utilized to improve the clarity of the images. In addition, motion analysis is useful in medical diagnosis.

Unfortunately, the lack of clarity in the images makes it difficult to provide reliable motion analysis. The techniques used in the prior art to perform motion analysis in ultrasound imaging may be grouped into one-dimensional and two-dimensional techniques. In one-dimensional measurements the echoes acquired along the ultrasoud beam direction line at different times are compared to detect the motion of a tissue or fluid. These techniques involve computation of the correlation of successive scans in the same direction. The measured correlation decreases with increasing motion, thereby providing a measurement of the amount of motion. Unfortunately, such techniques are limited to measuring the axial component, i.e., along the beam direction, of the motion.

The two-dimensional motion analysis techniques used in the prior art can be divided into two groups referred to as block-matching and optical flow in the following discussion. The block matching techniques attempt to match a block in the first frame to a block in the second frame by computing the correlation of the block in the first frame with each block of the same size in a defined search region of the second frame. The block in the second frame having the highest correlation is assumed to be the matching block, provided the correlation is above a threshold. The displacement of the two blocks provides an estimate of the motion of the corresponding region in the first frame. This technique is limited to the detection of linear translation of the block in question. If the motion is more complicated the results are less useful, since different portions of the block will have different velocities. This type of more complicated motion is often encountered in medical imaging because of muscle contractions..

In the non-linear motion cases, optical flow methods have been found to be more reliable. These models assume that the brightness of a particular point in a pattern is constant as the pattern moves. Unfortunately, the computational workload inherent in prior art optical flow computations is too high for implementation in routine ultrasoud imaging. Approximations to the optical flow method requiring lower computational resources have been proposed; however, the results from these techniques are very sensitive to noise.

Broadly, it is the object of the present invention to provide an improved ultrasound imaging system.

It is a further object of the present invention to provide an ultrasound imaging system that can measure the motion of various points in a sequence of ultrasoud images.

It is a still further object of the present invention to provide an ultrasoud imaging system that can combine successive frames in a sequence to provide improved image quality even when the boundaries that are being imaged are in motion.

These and other objects of the present invention will become apparent to those skilled in the art from the following detailed description of the invention and the accompanying drawings.

SUMMARY OF THE INVENTION

The present invention is a method for measuring the interframe movement of pixels in a second ultrasoud image frame with respect to the pixels in a first ultrasoud image frame. The movement information may be displayed to provide enhanced information about the underlying physiology or to provide a temporally compounded image having reduced noise. In the preferred embodiment of the present invention, the pixels that actually change between flames are identified. The first frame is divided into blocks and an estimated velocity computed for each block having a sufficient number of pixels that actually moved between the first and second frames. After all of the velocity estimates have been computed, blocks having questionable velocity estimates are identified. Blocks for which the velocity estimate was questionable are then provided with a velocity estimate by interpolating the velocity vectors of the nearby blocks having valid velocity estimates. The preferred method for estimating the velocity utilizes a modified optical flow computation that is more stable than prior art optical flow models.

DETAILED DESCRIPTION OF THE INVENTION

The present invention will be explained in terms of generating an image from two frames of an ultrasoud sequence. However, it will be apparent to those skilled in the art that the motion estimation scheme taught herein may also be applied to generating a display the showing the motion of various pixels in an image from frame to frame or measurements of such motion for other forms of analysis.

The present invention provides either of two display formats, referred to as a reconstructed image and a persistent image, respectively. The reconstructed image may be thought of as a sequence of still images computed from the reference frame. The persistent image may be thought of as a new version of the $k^{th}$ frame.

The simplest form of reconstructed image constructs a time averaged image from a sequence of two frames by identifying a pixel in the second frame corresponding to each pixel in the first frame and then averaging the corresponding pixels to provide the corresponding pixel in the averaged image. Hence, if the pixel at (i,j) in the first frame corresponds to a point on a physical structure in the patient that moved to (i+dx, j+dy) at the time the second frame was taken, the pixel value displayed at (i,j) in the averaged image will be $\alpha(I_1(i,j)+(1-\alpha)I_2(i+dx, j+dy)$ where $I_1(x,y)$ is the intensity distribution in the first frame, $I_2(x,y)$ is the intensity distribution in the second frame, and $\alpha$ is an averaging weight having a value between 0 and 1.

If more than two frames are used, a reference frame and an accumulated displacement with respect to that frame are stored. For each pair of frames, the displacement of the pixels in the second frame relative to the first frame of the pair is computed and added to the displacement that has been computed between the reference frame and the first frame of the pair. A new reconstructed frame is then computed by averaging the reference frame with a frame whose pixels are those of the second frame of the pair displaced by the accumulated displacement.

Figure 1:
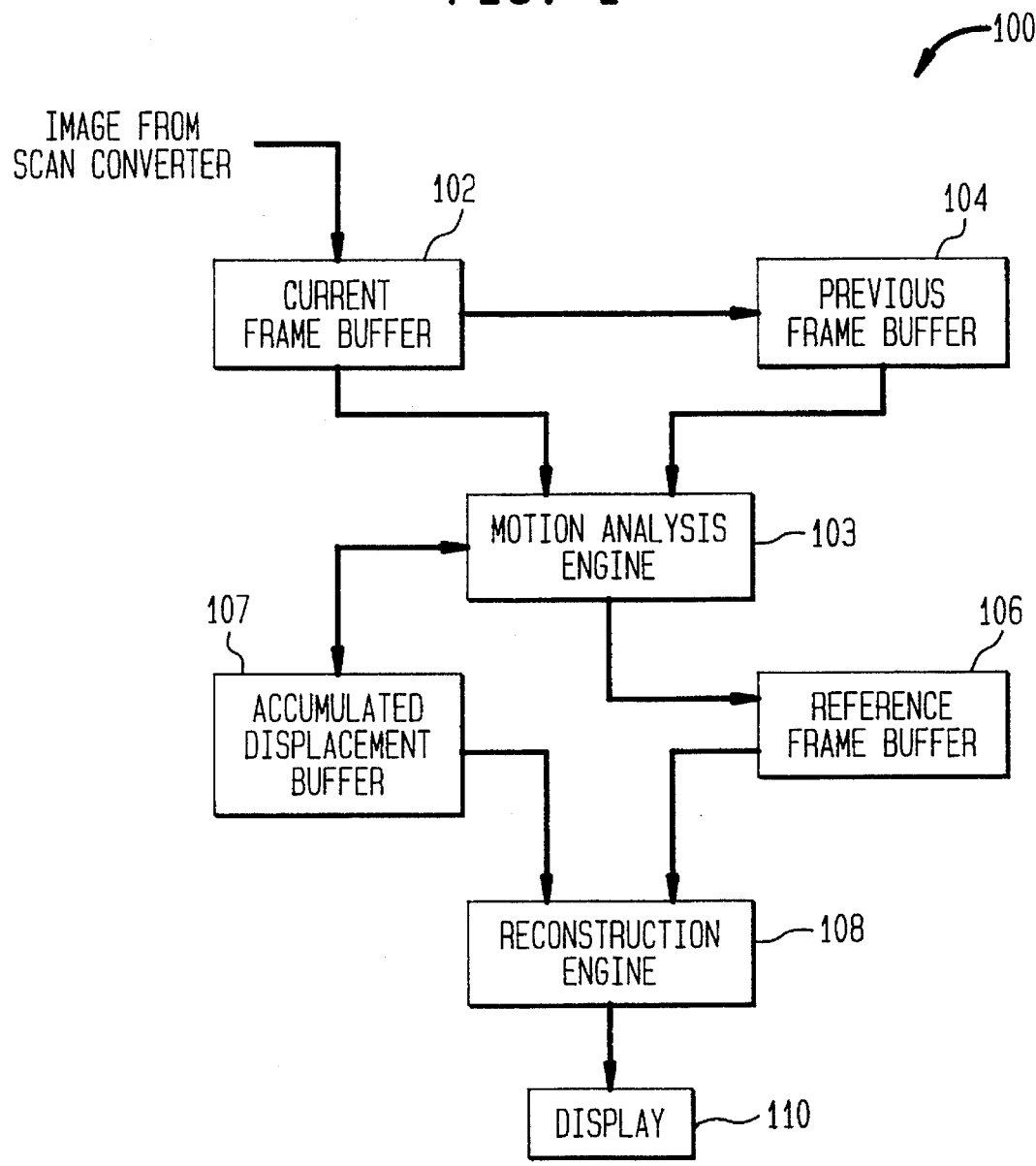
FIG. 1 is a block diagram of an apparatus for generating a reconstructed image according to the present invention.

A block diagram of an apparatus for generating and displaying a reconstructed image is shown in FIG. 1 at 100. The image from the scan converter of an ultrasound image acquisition system is stored in a buffer 102. The image from the previous frame, frame (K-1), is stored in a second buffer 104. A motion analysis system 103 as described below computes the displacement of various groups of pixels between the two images. This computed displacement is used to update the accumulated displacement for the pixels of the Kth frame relative to those of reference frame which is stored in buffer 106. The accumulated displacement is stored in buffer 107. The reconstructed frame is then computed by the reconstruction engine 108 from the pixels of the reference image and the current frame and sent to display 110. Finally, the contents of the current image are moved to the previous frame buffer 104.

In the case of the persistent image, the two frames are combined and the combined frame is then used to update a "persistent" image which represents a more slowly time varying image. In the general case in which a displacement is computed for each pixel between the two frames, the (k-1)th and kth frames are averaged to generate a new image $I'_k$ where $$I'_k(x+dx, y+dy)=\alpha(I_1(i,j)+(1-\alpha)I_2(i+dx, j+dy)$$

This new image is then used to update a persistent image $H_k(x,y)$ as folows:

$$H_k(x+dx, y+dy)=\gamma H_{k-1}(x,y)+(1-\gamma)I'_k(x+dx, y+dy)$$

The constant $\gamma$ determines the level of "persistence". A large value of $\gamma$ more heavily weights the previous image information. The constant T may also be a function of position and the measured displacement as explained below. In the simple case in which $\gamma$ is a constant, $\gamma$ is preferably 0.8.

While the above equations utilize a simple frame averaging to generate I', other arrangements can be used to provide different types of image enhancement. For example, $$I'_k(x+dx, y+dy)=max\ [I_{k-1}(x,y),I_k(x+dx, y+dy)]$$

$$I'_k(x+dx, y+dy)=min\ [I_{k-1}(x,y),I_k(x+dx, y+dy)]$$

and $$I'_k(x+dx, y+dy)=[I_{k-1}(x,y)I_k(x+dx, y+dy)]^{0.5}$$

have been found to provide useful image enhancements for different classes of ultrasound images.

Figure 2:
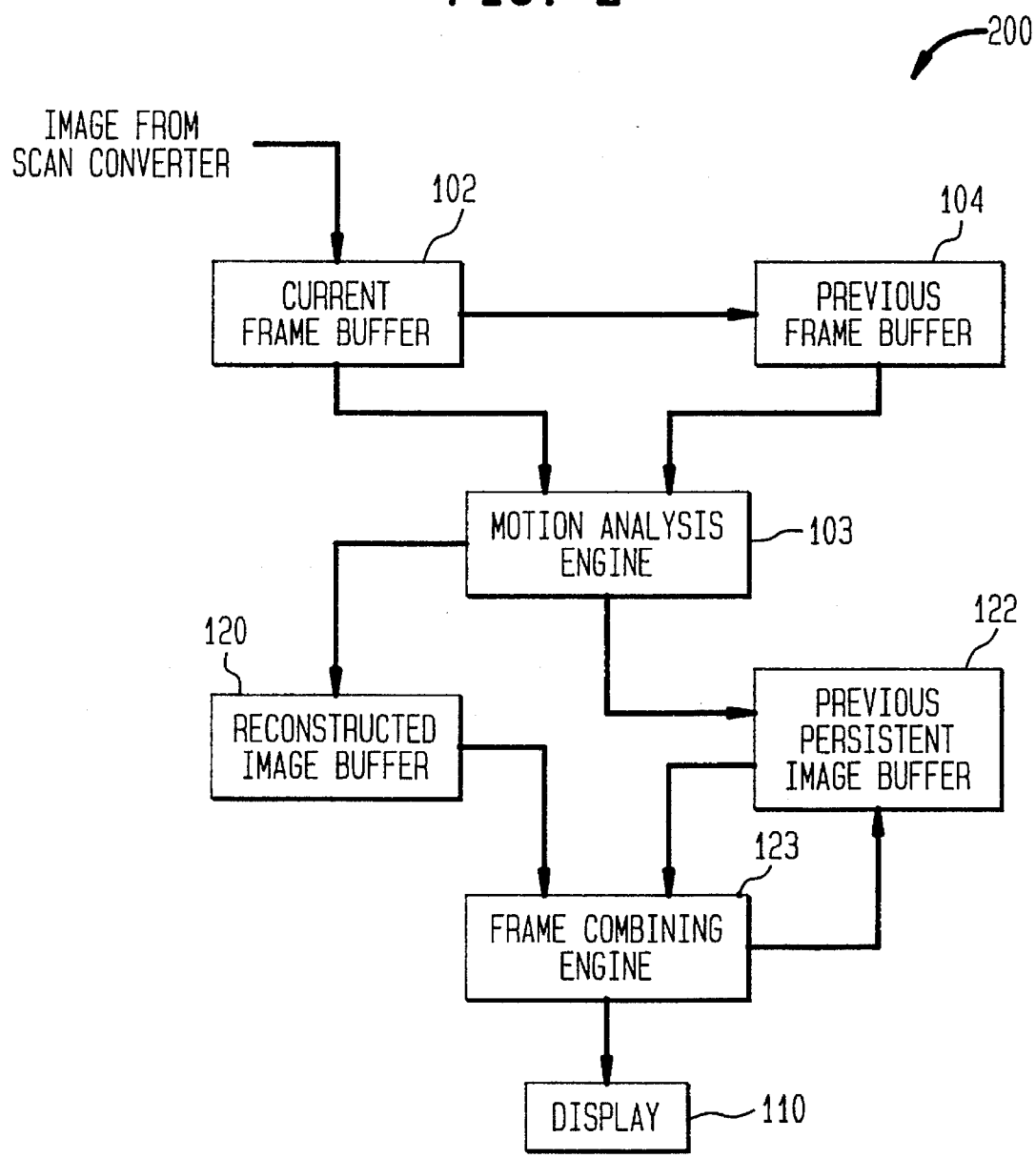
FIG. 2 is a block diagram of an apparatus for generating a persistent image according to the present invention.

Refer now to FIG. 2 which is a block diagram of an apparatus 200 for generating a persistent image as described above. To simplify the discussion, those elements of apparatus 200 which serve the same function as elements shown in FIG. 1 have been given the same reference numbers as used in FIG. 1 and will not be discussed further here. The displacements computed by the motion analysis engine 203 are used to compute the reconstructed image I' discussed above and the reconstructed image is stored in a buffer 120. The previously computed persistent image is stored in buffer 122. Frame combining engine 123 generates the new persistent image H and displays it on display 110. The new persistent image is then moved to buffer 122 and the contents of buffer 102 are moved to buffer 104.

As noted above, the most general persistent image calculation would allow the "constant" $\gamma$ to vary with (x,y) as a function of the detected velocity of the pixels, i.e., the displacement of the pixels corresponding to a structure at (x,y) in the first frame with respect to the pixels corresponding to that structure in the second frame. For example, this variation may be used to provide image enhancement. If organ boundaries are to be enhanced in exchange for less noise reduction, $\gamma$ is reduced in regions of having larger detected velocities. To obtain strong speckle reduction, $\gamma$ is increased in regions having larger detected velocities.

In systems having limited computational power, it is not always possible to perform the full persistence computation described above. In such systems, a simplification of the full persistence image display is desirable. The simplest system computationally is obtained by dividing each of the two frames into blocks and assigning a $\gamma$ value for each block. The value of T can be determined as de, scribed above for various image enhancement effects. The degree of change between two frames may be measured by computing the correlation of the two corresponding blocks or the sum of the absolute value of the pixel by pixel difference of the two blocks. The resulting persistent image will then be "persistent" in only those blocks that did not change.

If additional computational resources are available, the degree to which the pixels have moved between the frames may utilized by determining a block displacement between the frames. In such a system, the first image is divided into blocks. The correlation of a block in the first image with each possible block of the same size in the second image is computed. The block in the second image having the highest correlation value is assumed to be the corresponding block in the second image. Once the corresponding block is identified, a displacement (dx,dy) can be assigned to all of the pixels in the first block. The persistence computation then proceeds as described above in the general case. Again, it should be noted that $\gamma$ may be varied depending on the magnitude of (dx,dy). In addition, $\gamma$ may be set to zero for those blocks for which a suitable match was not found in the second frame, i.e., the degree of correlation was too low. To speed the computations for this approximation to the general persistent image, the search in the second image can be limited to a region consistent with the maximum expected displacement of any block from frame to frame.

Other forms of block displacement computations will be apparent to those skilled in the video arts. For example, a hierarchical block motion scheme can be employed. In such a scheme, the first frame is first divided into large blocks and matches attempted with similar blocks in the second frame. In ultrasound images, the initial block will be selected such that it contains a sufficiently large number of pixels to allow the correlation to be measured with adequate statistical accuracy. If the correlation is too low, for a block, the block is broken into smaller blocks and a new attempt is made to find corresponding blocks in the second frame. The procedure is repeated until a satisfactory match is found or the block size becomes too small to provide reliable data.

In many cases, the motion is too complex to be adequately represented by a block correlation scheme. In these case, a modified optical flow computation is preferably used to determine the movement of a set of "reliable" pixels. The data from these reliable pixels is then interpolated to provide data for the rest of the image.

Denote the intensity of the image as I(x,y,t). It is assumed that the brightness of a particular point in a pattern in the image is constant as the pattern moves. Hence, $$\frac{dI}{dt} = 0 \tag{1}$$

for each such point. This constraint can be re-written as $$I_x \frac{dx}{dt} + I_y \frac{dy}{dt} + I_t = 0 \tag{2}$$

where $I_x$, $I_y$, and $I_t$ are the partial derivatives of image brightness with respect to x, y, and t, respectively. If the components of the velocity vector for the point in question are (U,V), then Eq. (2) can be re-written as $$I_x U + I_y V + I_t = 0 \tag{3}$$

The optical flow analysis used here assumes that the motion is sufficiently small from frame to frame that the interframe motion can be described in terms of an affine velocity vector field [U(x,y), V(x,y)]:

$$\begin{bmatrix} U \\ V \end{bmatrix} = \begin{bmatrix} Q & R \\ C & D \end{bmatrix} \begin{bmatrix} x \\ y \end{bmatrix} + \begin{bmatrix} q \\ r \end{bmatrix} \tag{4}$$

By rewriting the unknown parameters (q, Q, R, r, C, D) as the vector $\vec{x}$, the parameters ($I_x$, $I_x x$, $I_x y$, $I_y$, $I_y x$, $I_y y$) as the vector $\vec{\alpha}$ and f as $I_t$, Eqs.(3) and (4) may be rewritten in vector form:

$$\vec{\alpha} \cdot \vec{x} + f = 0 \tag{5}$$

For a set of N pixels in a region of interest, this equation can be solved by least squares methods for the unknown parameters $\vec{x}$, that is, the values of $\vec{x}$ for which $$\sum_{i=1}^{N} (\vec{a}^{(i)} \cdot \vec{x} + f^i)^2 \tag{6}$$

is minimized.

In generating the solution, it should be noted that the first frame, in general, provides the coordinates and the differences from the first frame to the second frame is used to generate the various partial derivatives in the vectors $\vec{\alpha}^{(i)}$ via conventional finite difference methods.

As noted above, the solutions of this problem can be quite sensitive to noise, since the underlying matrix can be ill-conditioned. To reduce the problems associated with ill-conditioned matrices and noise, the least squares equations are modified to include a regularization condition and a smoothing operator is applied to the image before processing. The least squares problem is then reduced to the solution of the normal equation, $$(A^T A + \alpha L^T L) \vec{x} + A^T \vec{b} = 0 \tag{7}$$

where $$A = \sum_{i=1}^{N} A^{(i)} \tag{8}$$

and $$\vec{b} = \Sigma f^i \vec{a}^i \tag{9}$$

Here the matrix $A^{(i)}$ has elements given by $$A_{k,j}{}^{(i)} = \alpha_k{}^{(i)} \alpha_j{}^{(i)} \tag{10}$$

and the matrix L is an identity matrix or a discrete approximation to a derivative operator. For example, a typical derivative operator version of L is given by $$L = \begin{bmatrix} 1 & -1 & 0 & \ldots & & 0 \\ 0 & 1 & -1 & 0 & \ldots & 0 \\ & & \cdot & \cdot & & \\ & & & \cdot & \cdot & \\ 0 & 0 & \ldots & 1 & -1 & 0 \\ 0 & \ldots & & 0 & 1 & -1 \end{bmatrix} \tag{11}$$

The parameter $\alpha$ which is greater than 0 is a constant that determines the strength of the normalization condition. This parameter is typically between 0 and 1. The optimum value depends on the singularities of the matrix A. The value of $\alpha$ is set to the minimum singular value of matrix A.

Figure 3:
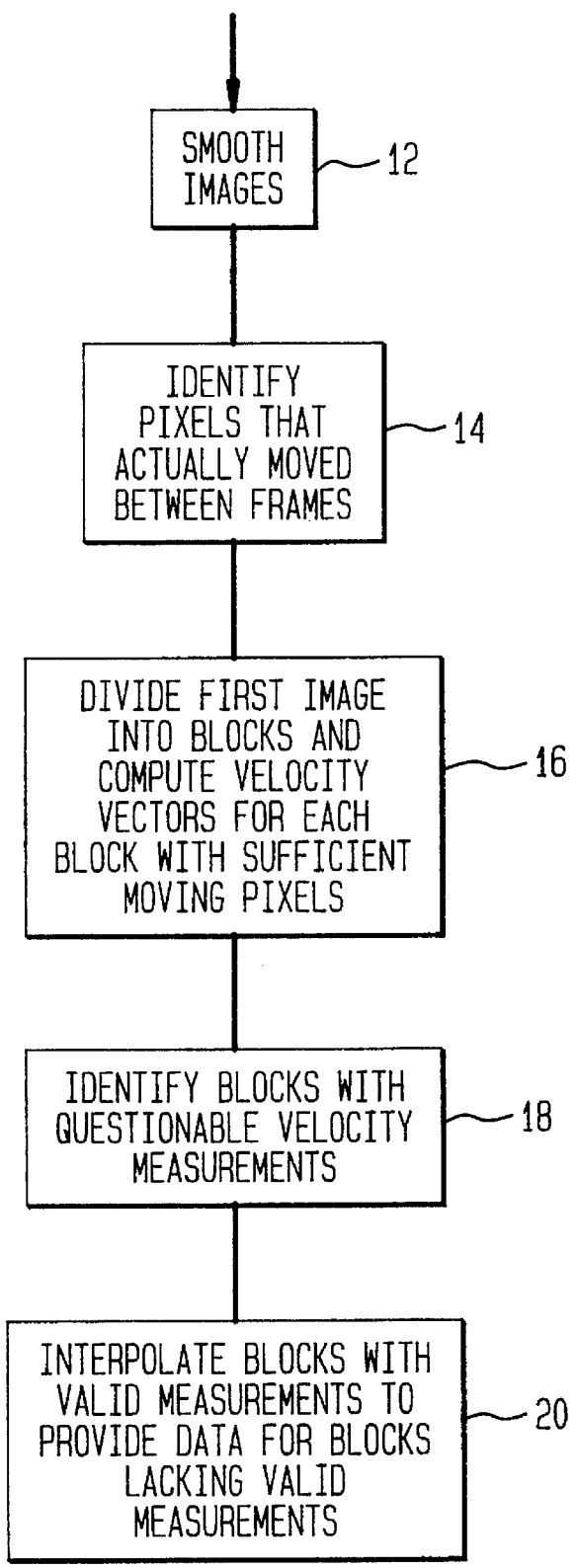
FIG. 3 is a flow chart of a method for computing the velocity of each pixel in an image from a time sequence.

Refer now to FIG. 3 which is a flow chart of a method for computing the velocity of each pixel in an image from a time sequence of two frames. To minimize problems associated with noise, the images are processed before applying the optical flow method to the selected pixels. In the preferred embodiment of the present invention, a 5×5 pixel averaging filter is applied to each pixel to generate a continuous image with smooth spatial derivatives as shown at 12.

Those pixels that actually moved from frame to frame are identified as shown at 14. This is accomplished by subtracting the two frames. For example, this procedure may be carried out by a bit-wise XOR operation on the respective pixels. This eliminates pixels that did not move. To assure continuity, any isolated pixels that moved are also removed. In the preferred embodiment of the present invention, this is accomplished by dividing the image into blocks and counting the number of pixels in each block that moved. If a block has less than a predetermined number of pixels that moved, all of the pixels in the block are removed from further computation.

The velocity field is computed in two steps. First, the image is broken into small boxes, typically, 7×7 pixels. If a box has less than a predetermined number of pixels that moved, it is not computed. If the box has sufficient valid pixels, i.e., pixels that moved as described above, Eq. (7) is solved for the pixels in that box and the velocity obtained for the pixels. The minimum singular value of the matrix A is stored together with the velocity for the box as shown at 16. In the preferred embodiment of the present invention, the regularization matrix used is an identify matrix, and A is decomposed using conventional singular value decomposition, since singular value decomposition methods are stable even for a near-singular matrix. The singular values obtained in the decomposition are used to in the error analysis as discussed below in more detail and to set the value of regularization parameter, $\alpha$.

When all of the boxes in the image have been computed, a threshold is determined by averaging the stored values for the minimum singularities discussed above and setting the threshold at a fraction of this average, typically 20 dB below the average. Any box having a stored minimum singularity that is less than this threshold is marked as invalid as shown at 18. Such cases arise when the matrix A is ill-conditioned either because of numerical errors or the failure of the assumptions in the optical flow model. The velocities for any blocks that were marked invalid are then computed by interpolating the velocity values of the nearest boxes having valid velocity values determined by the optical flow computation as shown at 20. Any boxes that were not computed by the optical flow model because the boxes contained "static" pixels, as described above, are assigned a velocity of zero.

As noted above, one application of the motion analysis system of the present invention is to provide a temporally compounded image, i.e., the persistent image, which has reduced speckle noise. This method is based on the observation that physiologic movements effect the speckle pattern differently than the boundaries of the tissues. In temporal compounding, the motion analysis system taught above is used to reconstruct a new sequence of image with static tissue structures. Here, two frames are combined by identifying the pixel in the second frame that corresponds to a pixel in the first frame on the assumption that the pixel in the second frame resulted from the movement of the pixel in the first frame. The two intensity values are then averaged to produce a pixel in the display frame.

It will be apparent to those skilled in the art that the velocity, or displacement, measured by the method of the present invention may be used to measure other physiologic parameters such as the strain in the underlying physiologic structures during movement. The local velocities can also be displayed on an image, either the averaged image discussed above or one of the frames used to compute the velocities, to provide an enhanced image which emphasizes regions of motion.

While the above embodiments of the present invention have been described in terms of a modified optical flow computational method, it will be apparent to those skilled in the art that other movement measurement techniques may be used to provide the time averaged image described above. For example, the block movement algorithms may be used in the case of linear velocities, and the conventional optical flow least squares method may be used if the images are "well behaved". The method taught above is preferred because it is better suited to noisy data and poorly conditioned matrices.

It will be apparent to those skilled in the art that the present invention may be practiced without the smoothing step used in the image preprocessing if the original image data is not too noisy.

The present invention is most advantageously practiced on a general purpose digital computer of the type normally included in ultrasound imaging systems. However, it will be apparent to those skilled in the art that the method may be practiced on a wide variety of computing platforms without deviating from the teachings of the present invention.

Various modifications to the present invention will become apparent to those skilled in the art from the foregoing description and accompanying drawings. Accordingly, the present invention is to be limited solely by the scope of the following claims.

What is claimed is:

1. A method for measuring the interframe movement of pixels in a second ultrasound image frame with respect to the pixels in a first ultrasound image frame, said method comprising the steps of:

(a) identifying pixels in said first frame that changed in intensity between said first and second frames;

(b) dividing said first image into blocks;

(c) computing an estimate of the velocity of at least one of said block having pixels that changed therein;

(d) for each said block for which said estimate of the velocity was computed, determining if said estimate is valid;

(e) computing a velocity value for each block not having a valid estimate by interpolating the valid velocity estimates from at least two other blocks that had valid velocity estimates.

2. The method of claim 1 further comprising the step of applying a smoothing operator to each said image prior to step (a).

3. The method of claim 1 wherein step (c) comprises finding the solution of Eq. (7).

4. The method of claim 3 wherein step (d) comprises comparing the minimum singular value of the matrix A for each block with the average of said minimum singular values.

5. A method for generating a new persistent image from a previously generated persistent image and first and second ultrasound image frames, said method comprising the steps of:

(a) for at least one pixel in said first image, identifying a pixel in said second image corresponding to said pixel in said first image to generate a pixel of combined frame image; and (b) generating a pixel in said new persistent image at a coordinate determined by a pixel in said first image by setting the intensity of said pixel in said compounded image to a value equal to a weighted sum of the pixel intensity in said combined frame image and the pixel intensity of a corresponding pixel in said previously generated persistent image.

6. The method of claim 5 wherein step (a) comprises determining the movement of said pixel in said first image between said first and second ultrasound images.

7. The method of claim 6 wherein said weighted sum utilizes a weighting factor that depends on said determined movement.

8. The method of claim 7 wherein said step of determining the movement of said pixel in said first image between said first and sceond ultrasound images comprises comparing a block of pixels containing said pixel in said first image with a block of pixels of the same size in said second ultrasound image.

9. The method of claim 6 wherein said step of determining the movement of said pixel in said first image comprises:

(c) identifying pixels in said first frame that changed in intensity between said first and second frames;

(d) dividing said first image into blocks;

(e) computing an estimate of the velocity of each said block having pixels that changed therein;

(f) for each said block for which said estimate of the velocity was computed, determining if said estimate is valid; and (g) computing a velocity value for each block not having a valid estimate by interpolating the velocity estimates in at least two other blocks that had valid velocity estimates.

* * * * *